Jan. 20, 1948.  C. A. HOCHWALT ET AL  2,434,850
PROCESS FOR PRODUCTION OF FORMALDEHYDE
Filed March 6, 1942
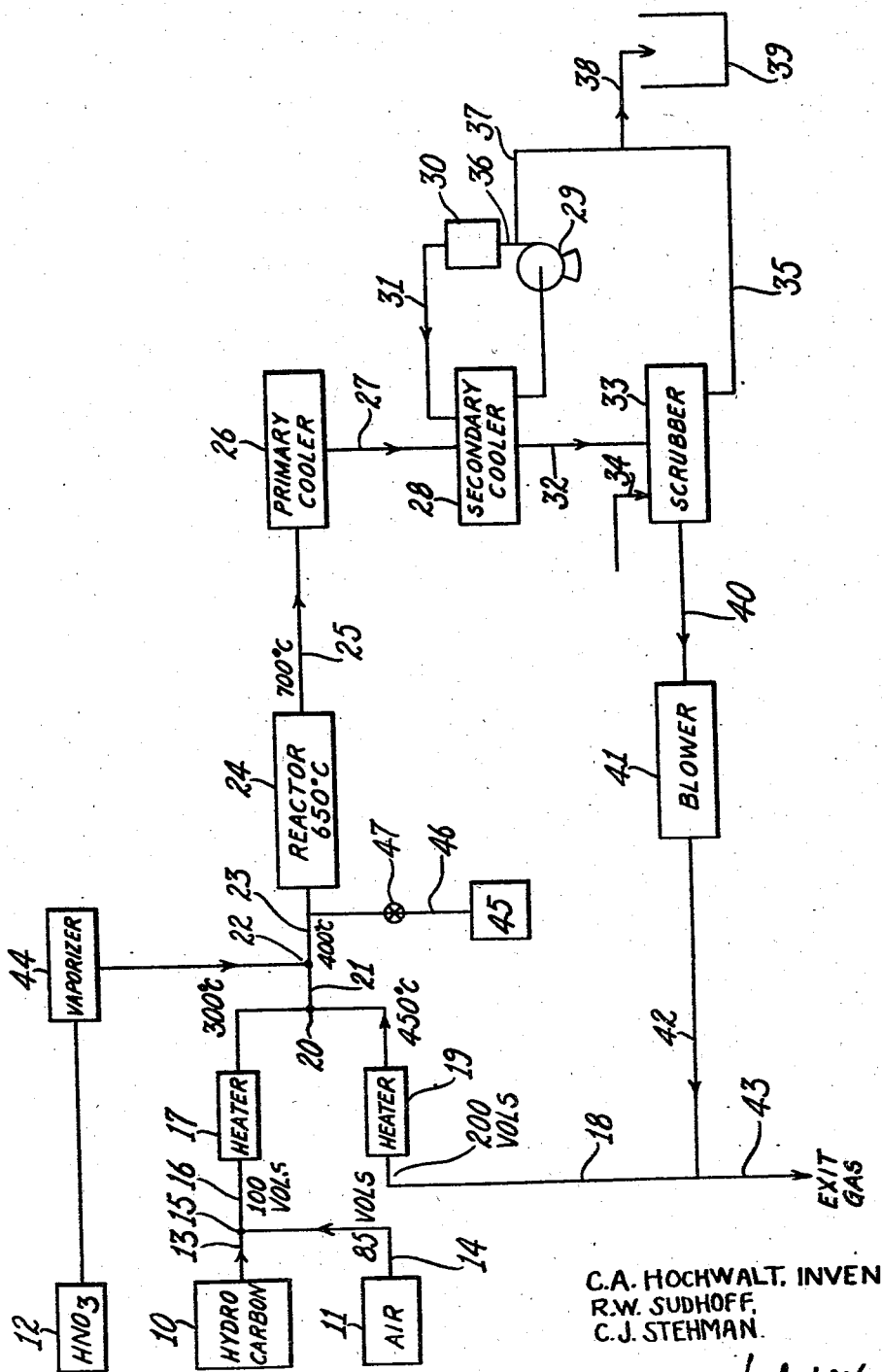
C.A. HOCHWALT, INVENTORS
R.W. SUDHOFF,
C.J. STEHMAN.
BY
ATTORNEY Patented Jan. 20, 1948

2,434,850

UNITED STATES PATENT OFFICE 2,434,850

PROCESS FOR PRODUCTION OF FORMALDEHYDE

Carroll A. Hochwalt, Rahn Road, and Carlyle J. Stehman and Roy W. Sudhoff, Vanburen Township, Montgomery County, Ohio, assignors to Monsanto Chemical Company, a corporation of Delaware Application March 6, 1942, Serial No. 433,648

7 Claims. (Cl. 260—604)

This process relates to the production of formaldehyde by the oxidation of low molecular weight hydrocarbons, particularly aliphatic hydrocarbons.

Previously known processes for producing formaldehyde by the oxidation of hydrocarbons have employed as catalysts either nitric oxide, nitrogen peroxide or a great variety of solid catalysts such as the oxides of the various metals. While a great deal of work has been done on this process the yields of aldehyde per cubic foot of hydrocarbon have been uniformly low and for this reason have not been commercially developed to any great extent except in those instances where a plentiful supply of suitable hydrocarbons was available.

In general we have found the use of solid catalysts to be unsatisfactory for this reaction. We prefer to employ the known gaseous catalysts such as those derived from nitric acid, i. e., NO and $NO_2$.

We have also found, as have others, that in order to effectively oxidize hydrocarbons to formaldehyde, that the oxidation reactions must be carried out in a chamber or tube which has been suitably treated so as to prevent objectionable catalysis of the hydrocarbon oxidation reaction and also the further oxidation of the formaldehyde produced thereby. By "objectionable" catalysis of the hydrocarbon oxidation reaction we mean the undesired conversion of the hydrocarbon oxidation products to carbon dioxide and water, that is "complete" oxidation of the hydrocarbons.

Accordingly we provide a coating upon heated surfaces of the oxidation chamber which are exposed to contact with the reacting gases, in order to prevent the objectionable surface catalysis of the reaction, mentioned above. While a great many surface coatings have been proposed by others and tested by ourselves, not many materials are suitable for this purpose.

Since a commercial oxidizing chamber is conveniently made of iron or alloys thereof, the protective coating upon the walls of such chamber which are to be exposed to the oxidizing gases, is conveniently coated with a phosphate of iron by applying liquid phosphoric acid or phosphoric vapors, i. e., vaporized phosphoric acid including $P_2O_5$ thereto. This may be done by merely wetting the surfaces of such chamber or tube with acid of a suitable strength and thereafter heating the tube to react the phosphoric acid with the iron of the chamber. Depending upon the extent of the reaction the various phosphates of iron are formed. These are the normal, the dibasic and the monobasic phosphates which are, by the action of heat, converted in the case of the latter two phosphates to the pyrophosphate and the metaphosphate respectively. The coating may therefore comprise not only normal phosphates but the heat reaction products of such phosphates or mixtures thereof. A necessary characteristic of a suitable tube coating for the present reaction is the requirement that not only should the coating be inert with respect to the oxidation reactions, but it should also be resistant to thermal shock, that is, it should remain adherent upon the underlying metal wall of the chamber. Since temperature changes of the entire reaction chamber cannot practically be completely overcome, the coating should possess the ability to adhere to the chamber wall without flaking off due to temperature changes over fairly wide ranges.

As stated above a satisfactory tube coating has been found to comprise the reaction products of phosphoric acid, or $P_2O_5$, with iron. The mixture of phosphates of iron produced by the reaction of either liquid or gaseous $H_3PO_4$ or $P_2O_5$ have been found to possess the requisite degree of inertness with respect to the oxidizing reaction and while, by itself not overly resistant to thermal changes, because of the ease of application which as pointed out below may be accomplished at the working temperature, has been found to be a practically usable coating material.

As far as the phosphate coatings are concerned, the tendency of the coating to flake off is not usually encountered during the actual operation of the equipment, since during normal operation thereof, the temperature of the reactor is maintained at a fairly constant level. However, when the equipment is started up and the reaction chamber is heated from room temperature to the reaction temperature in the neighborhood of 650° C., a very pronounced tendency to flake or scale off is encountered. Again when it is necessary to shut down the unit, at which time the temperature drops from about 650° C. to room temperature the flaking off tendency is again encountered.

The tendency of the coating to flake off is somewhat mitigated by uniform and gradual heating and cooling especially by the use of a liquid (molten lead or salt) surrounding the tubular reaction chamber. By the use of such liquid heating means, it is possible to bring the tubular reactor up to working temperature without the excessive loss of coating which occurs when employing direct firing as by a gas or oil burner. A further feature, which contributes to the practical workability of the present process is the fact that the coating upon the tubular reactor may be repaired or renewed while the reactor tubes are in place in the equipment, and without material change of temperature of the tubes. Such replacement or renewal of the coating or parts thereof may conveniently be effected by volatilizing phosphoric acid or other volatile phosphorus compounds thereof from a separate chamber and then passing the volatile products into the reaction chamber, where the desired combination of phosphoric acid with the metal walls will take place.

Several methods are accordingly available for coating the interior of reaction tubes. According to one method we may volatilize a high strength phosphoric acid, such as meta-, pyro- or tetraphosphoric acid, merely by the application of heat to the acid and pass the volatile acid into the tubular converter, either while the hydrocarbon oxidation reaction is being carried out therein, or while the supply of hydrocarbon gas has been temporarily discontinued.

Another method which may be employed is to volatilize anhydrous phosphorus pentoxide in a separate chamber by the application of heat and then pass the volatile $P_2O_5$ into the reaction tube. When volatilizing either phosphoric acid or $P_2O_5$ into the chamber, a current of dry air or other gas, or the reacting gases themselves may be passed through or over the $P_2O_5$ supply source and thereby carry the volatile product into the reaction chamber.

A further method which may conveniently be employed is to burn phosphorus preferably externally of the reaction tube by passing air over phosphorus in controlled amounts and thereafter passing the oxidation products into the reaction chamber.

The above methods afford a readily available means for protectively coating the interior of the reaction chamber in which the hydrocarbon oxidation reaction is carried out, without necessarily changing the temperature thereof and without interrupting the main oxidation reaction going forward in the chamber. The coating thus obtained is free of alkali metals such as sodium or potassium.

The reaction chamber should be heated, which is done by the application of heat at a uniform temperature level. The attainment of a uniform temperature of the reaction tube precludes the use of direct heat by fuels as such heat has ordinarily been applied. In place of such direct application of heat, we find that the temperature may be maintained more uniformly by the use of a liquid heating medium surrounding the tube. By this means a uniform temperature of the tube or chamber is attained without the use of an excessive temperature gradient through the tube walls. The liquid heating medium surrounding the reaction tubes moreover provides not only a large reservoir of heat at constant temperature but also provides means whereby heat may flow freely through the walls thereof without a greatly increased film temperature of the tube walls.

In general, various aliphatic hydrocarbons may be used in our process, including methane, ethane, ethylene propane, propylene, butane, etc. Such hydrocarbons are normally gaseous at ordinary temperatures and pressures, however other volatile hydrocarbons, such as the natural gasoline hydrocarbons may also be employed.

In carrying out the reaction for the production of formaldehyde by oxidation of low molecular weight hydrocarbons we mix together the gaseous hydrocarbon and air in the proportions of approximately 15% by volume of a hydrocarbon such as propane, together with about 85% by volume of air. The proportions of air and hydrocarbon may be varied somewhat, in any event it is desirable to keep the proportion of hydrocarbon above the upper explosive limit. This gas mixture is passed into a preheater serving to heat the hydrocarbon-air mixture to a temperature in the neighborhood of 300° C.

To a separate preheater we supply the residual gas mixture which has already passed through the reactor and from which the oxidized hydrocarbons, i. e., formaldehyde or other aldehydes have been largely removed by scrubbing. This gas is for convenience termed "recycle" gas and as stated above is supplied to the preheater wherein it is raised to a temperature in the neighborhood of 450° C. The preheated hydrocarbon-air mixture and the preheated "recycle" gas are mixed together in the approximate ratio of 100 volumes of the hydrocarbon-air mixture together with 200 volumes of preheated "recycle" gas mixture. The mixing of these two gases is conveniently done in such a way as to conserve the heat in the gases and to produce a gas mixture at a temperature in the neighborhood of 400° C. To this gas mixture is now added a small amount of aqueous nitric acid vapor (also superheated to approximately 400° C.) in such a proportion that the final mixture contains about 1.2 volumes of 100% $HNO_3$ vapor.

After the nitric acid has been vaporized into the gas mixture the oxidation reaction starts. At this point the gases enter the reactor chamber. Some exothermic heat is liberated from the oxidizing hydrocarbon gases which heat serves to raise the temperature of the gases in the reactor. The gas temperature which is desirably finally obtained is a temperature in the neighborhood of 700° C., although the oxidation reaction, should it proceed to completion, would liberate sufficient heat to raise the temperature of the gases to a much higher point. Such a complete oxidation reaction is undesirable and is prevented by control of two factors; namely, (1) the time of sojourn in the reactor chamber, and (2) the maintenance of the walls of the reactor chamber uniformly at a temperature not over about 650° C.

The first necessary condition mentioned above is readily obtained by controlling the velocity of gases passing through the reactor chamber. The second condition is obtained by surrounding the walls of the reactor chamber with a fluid transfer medium such as molten salts or molten lead.

Although the temperature of gases entering the reactor may be somewhat below the temperature of the reactor and the temperature of the gases leaving the reactor are somewhat above the temperature of the reactor, the overall effect of the reactor chamber is to conserve the heat of the reacting gases by adding heat to the entering gases and withdrawing approximately the same amount of heat from the exit gases. The reactor thus conforms to a substantially adiabatic chamber maintained at the preferred temperature as stated above and providing an optimum time of sojourn of the gases without a material net transfer of heat from the gases to the reactor.

We have found that the optimum time of sojourn of the gases in the reactor ranges from 0.1 second to 0.2 second and may be as high as 0.4 second.

Because of the complete submergence of the tubes in the molten liquid bath at a constant temperature, some transfer of heat desirably occurs from end to end of the reactor tubes through the bath. As pointed out above, the gases at the exit end of the tube are at a higher temperature than the bath temperature, and accordingly some heat flows from the hotter gas through the tube walls into the liquid bath, which thereby becomes heated in the zone adjacent said hotter tubes. At the same time the incoming gases are at a somewhat lower temperature than the bath and accordingly some heat is absorbed from the bath by the gases. However, the bath being fluid will tend to equalize itself as to temperature either by natural convection, conduction or mechanical agitation. We prefer therefore to so adjust the temperature level of the reactor (the bath temperature) that the oxidation of the hydrocarbons is carried out to the desired extent without a material net transfer of heat between the gases undergoing oxidation and the bath surrounding the chamber or tubes.

The attainment of the above conditions is not independent of the conditions of preheat of the gases. It is accordingly necessary to preheat the gases to a degree such that the oxidation reaction may be carried out under substantially adiabatic conditions. We have found that such a degree of preheating may be carried out without loss of yield, by preheating the hydrocarbon-air mixture separately from the preheating of the "recycle" gas. Preferably the hydrocarbon-air mixture is heated to a point short of incipient oxidation. The permissible temperature will vary with the type of hydrocarbon used in the process—for propane the temperature will be in the neighborhood of 300° C.—while for methane the temperature will be somewhat higher.

The composition of the "recycle" gas produced when oxidizing propane, may be somewhat as follows:

| | Per cent |
|---|---|
| $CO_2$ | 1 |
| CO | 10 |
| $O_2$ | 2 |
| $H_2$ | 2 |
| Ethylene | 5 |
| Propylene | 2 |
| Methane | 5 |
| NO | 0.4 |
| Nitrogen | Balance |

Such gas contains less oxygen than the fresh hydrocarbon-air mixture, and consequently may be preheated to a somewhat higher temperature, as above mentioned. Due to the reactive nature of the gases when mixed it is undesirable in the present process to first mix the hydrocarbon-air portion with the "recycle" portion and then preheat the resulting mixture.

Gases upon leaving the reactor at a temperature of about 700° C., enter a primary cooler which may take the form of a steam boiler in which the gases contact boiler tubes which are maintained at a temperature of about 200° C. and which in turn cool the gases to a temperature of about 300° C. Upon leaving the cooler or boiler the gases are passed to a secondary cooler where they are contacted with the condensate obtained by cooling the gases and consisting mainly of an aqueous solution of formaldehyde. The temperature herein is further decreased to in the neighborhood of from 30° C. to 40° C.

Upon leaving the secondary cooler the gases are passed to a scrubber where they are additionally washed with a small amount of pure water in order to remove additional formaldehyde and then from the scrubber they pass to a blower which forces the gases, except for discharge or exit gases, back to the preheater mentioned above. The gases leaving the blower have a volume of approximately 290 volumes and since the above mixing proportions call for approximately only 200 volumes of "recycle" gas the excess gas amounting to approximately 90 volumes is discharged to the atmosphere.

Our process may be understood by reference to the accompanying diagrammatic flow sheet comprising the single figure of the drawing. On the flow sheet the numeral 10 indicates a source of hydrocarbon such as propane, the numeral 11 indicates a source of air and the numeral 12 indicates a source of nitric acid. Pipe 13 conveys the hydrocarbon and pipe 14 conveys air to a mixing valve 15. The preferred proportions of these gases are indicated as 15% by volume of hydrocarbon and 85% by volume of air. The hydrocarbon-air mixture is conveyed by pipe 16 to preheater 17 wherein the temperature is raised to approximately 300° C. Recycle gas is obtained from the system by means of pipe 18, conveyed to preheater 19 wherein the temperature is raised to in the neighborhood of 450° C.

The preheated hydrocarbon-air mixture and the preheated "recycle" gas mixture are conducted by pipes to mixing device 20 in such amount as to consist of approximately 100 volumes of hydrocarbon-air mixture and 200 volumes of recycle gas. The resulting mixture will therefore consist of a total of 300 volumes of mixed gas at a temperature of approximately 400° C., that is an intermediate temperature between that of the constituent gas mixtures. The gases, after leaving mixing device 20, pass by means of pipe 21 to another mixing device 22, at which point nitric acid vapor is introduced by means of pipe 23 connecting with the source of nitric acid 12. A vaporizer for vaporizing the nitric acid and preheating the vapors to the temperature of the gas with which it is to be mixed is indicated at 44. The nitric acid containing gas mixture thereafter passes by means of pipe 23 into coated metal tubes forming part of reactor 24. Reactor 24 consists of metallic tubes immersed in a liquid heating medium such as molten salts or molten lead, the temperature of the liquid surrounding the tubes being maintained at approximately 650° C. The time of sojourn may be between 0.1 second and 0.3 second or slightly more but should not extend to over 0.4 second. The time of sojourn of the gases in the reactor is controlled by proportioning the volume of gases passed through the tubes to the volume of the reactor tubes.

The gases leave the reactor tubes by means of pipe 25 and pass directly into a primary cooler 26 which may take the form of a steam boiler. In primary cooler 26, the gases are cooled down to in the neighborhood of about 300° C. and thereafter leave by pipe 27, passing directly into a secondary cooler 28. In secondary cooler 28 the gases are cooled by contact with a spray or film of condensate produced by cooling the gases entering the secondary cooler. The condensate is removed from a lower point of the secondary cooler by means of pump 29 and pumped into cooler 30 wherein the temperature is lowered approximately to that of the available cooling water temperature. The circulated condensate together with the new condensate leaves cooler 30 and flows by pipe 31 back into the secondary cooler 28. The gases leave secondary cooler 28 by means of pipe 32 and enter scrubber 33 which may conveniently take the form of a plate column. A small quantity of water is supplied by means of pipe 34 to scrubber 33 and is discharged from the scrubber by pipe 35. The product consisting of the condensate is withdrawn from pipe 36 which connects pump 29 to cooler 30 by means of pipe 37, and is then combined with the scrubber liquid flowing in pipe 35 forming the product of the process in pipe 38. The product of the process consists of an aqueous solution of formaldehyde of about 25% concentration and other aldehydes and acids which may thereupon be collected in tank 39.

The gases leaving scrubber 33 are drawn through pipe 40 into blower 41 and then enter pipe 42 which returns recycle gas to pipe 18. At the same time exit gas is withdrawn by means of pipe 43 from the system in such an amount as to maintain a constant pressure in the system.

For the purpose of rejuvenating the phosphoric acid coating on the reactor tubes, a source of phosphoric vapors is provided at 45 and is connected by pipe 46 with pipe 23 so that vapors of $P_2O_5$ or other phosphoric compounds may be continuously or intermittently introduced into the reactor tubes. A valve 47 in line 46 provides a method of control of these vapors.

Some latitude is possible in respect to the method and temperature of preheat of the gases. Thus, for example, while a preheat temperature of the hydrocarbon-air mixture may be employed with a contact time of about 0.4 second in the preheater, it is possible to increase the amount of preheat to a higher figure, say to 350° C. to 400° C. by suitably decreasing the contact time. Since the point of incipient oxidation is dependent upon both temperature and contact time we may safely increase the temperature to a higher degree by decreasing the contact time in the preheater, without encountering serious oxidation therein. Similarly, lower temperatures may, if desired, be employed.

The same considerations govern the conditions for preheating the "recycle" gas. Thus higher temperatures, such as 475° C. or 500° C., or even 550° C. may be attained by appropriately adjusting the contact time. Lower temperatures may likewise be employed. Moreover the proportions of recycle gas used may be changed from that given above.

The sole factor governing the choice of preheat of the gases is to assure the substantially adiabatic condition of the reactor during operation. The adiabatic state may of course be achieved at various temperature levels, hence it is not desired to limit the operation of the reactor to any particular temperature level. By appropriate choice of preheater temperature and by adjusting the other variables in known manner it is possible to arrive at a reaction temperature, which temperature will be generally within the limits ranging from 600° C. to 700° C., at which the reactor will, from a heat standpoint, be substantially adiabatic.

This condition is independent of the pressure of the gases within the reactor, hence the present process may be operated at atmospheric pressure, as well as at super-atmospheric pressures. Pressures generally may be 25, 50 or even 100 or 200 lbs. pressure, however at pressures of 200 lbs. and over the course of the oxidation reaction is influenced unfavorably.

As stated, the reactor is preferably constructed of iron, or alloy steel tubes, treated with phosphoric acid and immersed in a liquid heat-transfer bath. The tubes should be of at least ½ inch internal diameter and not larger than 1 inch internal diameter. Within this range of sizes the adiabatic condition is readily obtained and maintained for satisfactory operation.

What we claim is:

1. In the process for producing formaldehyde by the partial oxidation of normally gaseous aliphatic hydrocarbons in which a preheated gas mixture containing said hydrocarbons is oxidized and formaldehyde produced, the step of reacting said gases after preheating and during oxidation, in a reaction zone in contact with surfaces composed of the heat reaction product of phosphoric acid upon iron.

2. The process defined in claim 1 in which the oxidizing gases contain nitric oxide in catalytic amount.

3. In the process for producing formaldehyde by the partial oxidation of normally gaseous aliphatic hydrocarbons, in which a preheated gas mixture containing said hydrocarbons is oxidized and formaldehyde produced, the step of reacting said gases, after preheating in a reaction zone formed by surfaces composed of phosphates selected from the class consisting of: iron phosphate, iron pyrophosphate and iron metaphosphate.

4. In the process for producing formaldehyde by the partial oxidation of normally gaseous aliphatic hydrocarbons, in which a heated gas mixture containing said hydrocarbons and oxygen is oxidized while flowing through a heated iron tube to form formaldehyde, the steps of reacting said gases in a reaction zone defined by surfaces formed by the reaction of phosphoric vapors upon iron, and from time to time replenishing said surfaces with said phosphoric iron reaction product.

5. In the process for producing formaldehyde by the partial oxidation of normally gaseous aliphatic hydrocarbons, in which a heated gas mixture containing said hydrocarbon and oxygen is oxidized while flowing through a heated iron reaction zone to form formaldehyde, the step of volatilizing phosphoric vapors externally of said reaction zone and flowing said phosphoric vapors into said heated iron reaction zone.

6. In the process for producing formaldehyde by the partial oxidation of normally gaseous aliphatic hydrocarbons, in which a preheated gas mixture containing said hydrocarbons and oxygen together with catalytic amounts of nitric oxide is oxidized to formaldehyde while flowing through a heated tubular reaction zone provided with an interior surface composed of heat reaction products of iron with phosphoric acid and free of solid catalytic material, the said tubular reaction zone being maintained at an oxidizing temperature by immersion in a liquid heat transfer medium, the step of introducing said gases into said zone at a temperature somewhat below that of said liquid heat transfer medium, and withdrawing said gas from said zone at a temperature somewhat above that of said liquid heat transfer medium.

7. The process defined in claim 6 in which the said liquid heat transfer medium is maintained within the temperature range of from 600° C. to 700° C.

CARROLL A. HOCHWALT.
CARLYLE J. STEHMAN.
ROY W. SUDHOFF.

REFERENCES CITED

The following references are of record in the file of this patent:

UNITED STATES PATENTS

| Number | Name | Date |
|---|---|---|
| 1,729,711 | Curme | Oct. 1, 1929 |
| 1,870,816 | Lewis | Aug. 9, 1932 |
| 1,963,070 | Bludworth et al. | June 19, 1934 |
| 2,018,994 | Burke | Oct. 29, 1935 |
| 1,946,707 | Meingast | Feb. 13, 1934 |
| 774,824 | Blackmore | Nov. 15, 1904 |
| 1,392,886 | Bibb | Oct. 4, 1921 |
| 1,985,875 | Harter | Dec. 25, 1934 |
| 2,102,160 | Nashan | Dec. 14, 1937 |
| 1,678,775 | Gravell | July 31, 1928 |
| 2,260,111 | Caldwell | Oct. 21, 1941 |
| 2,044,665 | Burke | June 16, 1936 |
| 2,098,148 | Jarl | Nov. 2, 1937 |
| 2,273,826 | Bates | Feb. 24, 1942 |
| 1,580,740 | Legg | Apr. 13, 1926 |

FOREIGN PATENTS

| Number | Country | Date |
|---|---|---|
| 433,559 | Great Britain | Aug. 16, 1935 |
| 582,377 | France | Oct. 13, 1924 |
| 709,823 | France | May 26, 1931 |